United States Patent [19]

Randolph, Jr.

[11] 3,986,104

[45] Oct. 12, 1976

[54] DUAL FREQUENCY METAL DETECTOR SYSTEM

[75] Inventor: Byron B. Randolph, Jr., Phoenix, Ariz.

[73] Assignee: Robert F. Gardiner, Phoenix, Ariz.

[22] Filed: Jan. 19, 1976

[21] Appl. No.: 650,250

[52] U.S. Cl. .................................... 324/3; 324/41
[51] Int. Cl.² ............................................ G01V 3/08
[58] Field of Search ............... 324/3, 41; 340/258 R, 340/258 C; 331/56

[56] References Cited
UNITED STATES PATENTS

| | | | |
|---|---|---|---|
| 3,171,071 | 2/1965 | Brown | 331/56 X |
| 3,201,774 | 8/1965 | Vemura | 324/3 X |
| 3,492,567 | 1/1970 | Baker | 324/3 |
| 3,519,919 | 7/1970 | Rance | 324/3 |
| 3,686,564 | 8/1972 | Mallick et al. | 324/41 |
| 3,823,365 | 7/1974 | Anderson | 324/3 |
| 3,875,498 | 4/1975 | Mahan et al. | 324/3 |
| 3,961,238 | 6/1976 | Randolph | 324/3 |

*Primary Examiner*—Gerard R. Strecker
*Attorney, Agent, or Firm*—Cahill, Sutton & Thomas

[57] ABSTRACT

A metal detector circuit is disclosed utilizing a search coil inductively coupled to two parallel connected oscillator circuits operating at different frequencies for selectively responding to metal objects in the vicinity of the search coil. Each oscillator circuit may include a dual tuned resonant circuit for neutralizing the effects of ferromagnetic minerals in the vicinity of the search coil.

11 Claims, 2 Drawing Figures

DUAL FREQUENCY METAL DETECTOR SYSTEM

BACKGROUND OF THE INVENTION

The present invention relates to metal detector circuits, and more particularly, to metal detectors utilized to both detect and distinguish metal objects found near the surface of the earth.

DESCRIPTION OF THE PRIOR ART

The utilization of metal detectors to search out and find metal objects is a well developed art that has become increasingly important in recent years. It is not only important that such detectors be able to accurately locate a metal object when the detector apparatus is passed over the object, but also that the detector distinugish between valuable objects and trash objects. It is also advantageous to utilize a detector that is capable of ignoring the effects of ferromagnetic minerals occurring in the ground in the search vicinity.

By providing a selective response, permitting metal objects to be distinguished as well as detected, a metal detector can locatae valuable objects such as coins without the distraction of detecting worthless objects, such as bottle caps or aluminum pull tabs. Thus, a selective metal detector could detect more valuable objects in a given period than would a non-selective detector, since the necessity of digging up every metal object to determine its value and identity is avoided.

By providing a metal detector that is not affected by minerals in the soil being searched, the necessity for re-adjusting the apparatus to compensate for varying effects of ferromagnetic material in the soil at different locations becomes unnecessary. Since ferromagnetic minerals, such as black magnetic sand or ferric oxide ($Fe_3O_4$), are commonly found in areas where valuable metal objects are uncovered, the ability to ignore the varying background signals caused by the ferromagnetic minerals is a valuable asset.

It is therefore an object of the present invention to provide a metal detector for locating metal objects beneath the surface of the earth.

It is another object of the present invention to provide a metal detector for both detecting metal objects and distinguishing potentially valuable objects from potentially worthless objects.

It is still another object of the present invention to provide a metal detector that is not affected by the presence of ferromagnetic minerals in the ground being searched.

These and other objects of the present invention will become more apparent to those skilled in the art by referring to the following detailed description taken in conjuction with the accompanying drawing.

SUMMARY OF THE INVENTION

Briefly stated, and in accordance with one embodiment of the invention, a metal detector is constructed utilizing a search coil inductively coupled to two parallel connected oscillator circuits operating at different frequencies. Each oscillator includes a dual tuned resonant circuit which serves to neutralize the effects of ferromagnetic minerals in the vicinity of the search coil. When a metal object with a high Q is placed in the search coil field, the amplitude of oscillation of both frequencies will be affected. However, the amplitude of the low frequency oscillator will be more affected, indicating the presence of a potentially valuable object. When a metal object with low Q, or a small ferrous object, is placed in the field of the search coil, once again the amplitude of both oscillators is affected. However, the high frequency oscillator will be more affected than the low frequency oscillator which indicates the presence of a potentially worthless object.

DETAILED DESCRIPTION OF THE ILLUSTRATIVE EMBODIMENT

Figure 1:
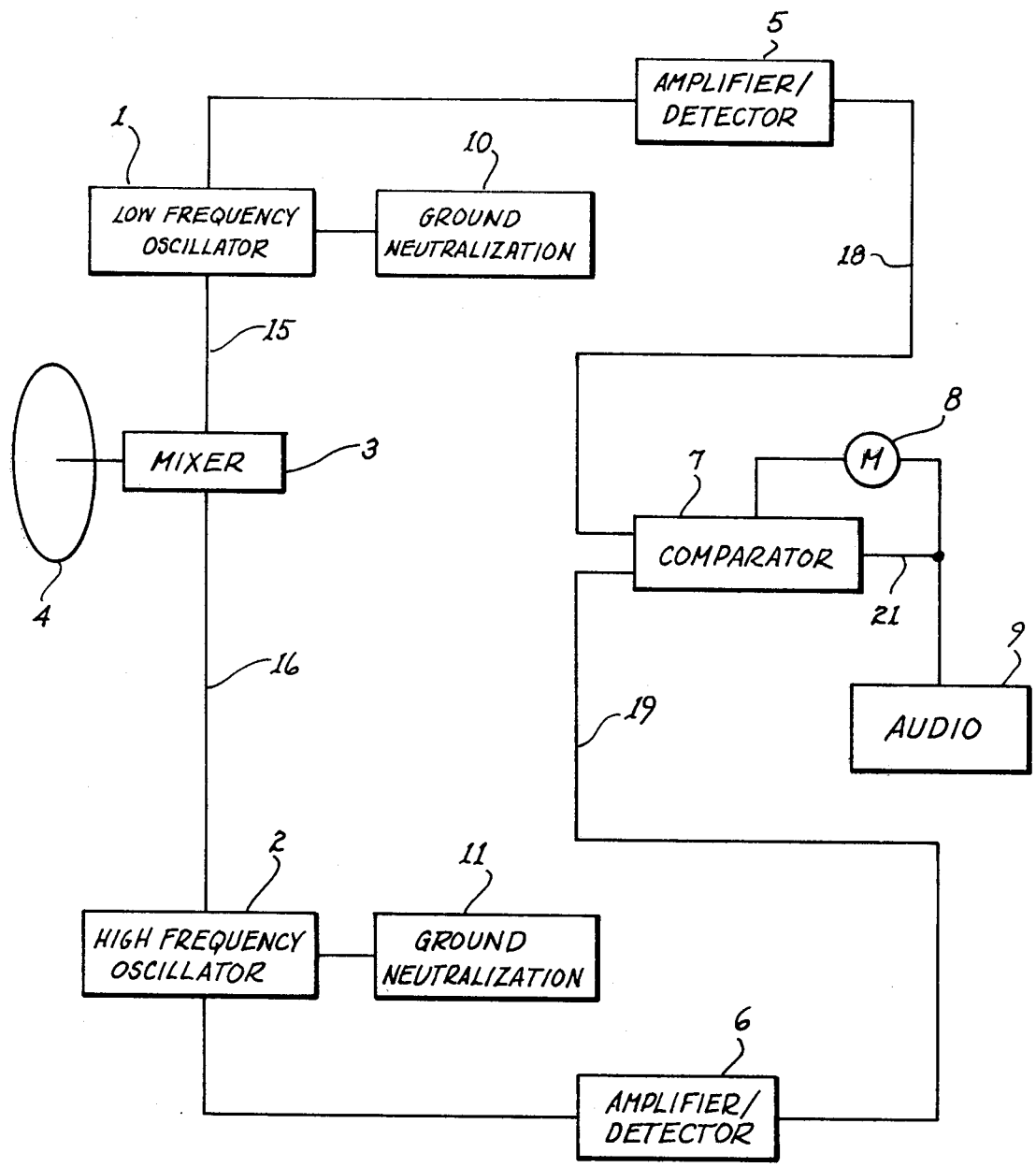
FIG. 1 is a block diagram of a metal detector embodying the present invention.

As shown in FIG. 1, a low frequency oscillator 1 and a high frequency oscillator 2 have their output signals combined by a mixer 3 and applied to an inductive search coil 4. The output of oscillator 1 and the output of oscillator 2 are both sine waves, but of different frequencies. The signals are combined in mixer 3 so that a composite waveform containing both high and low frequency components is applied to search coil 4. Mixer 3 also acts to prevent any signal transfer between the two oscillators.

Oscillators 1 and 2 each also provide a low amplitude signal which is applied, respectively, to amplifier/detector circuits 5 and 6. The output of amplifier/detector 5 and the output of amplifier/detector 6 are each a DC signal with a voltage proportional to the amplitude of the input to them from the respective oscillator 1 or 2. Both of the DC signals are applied to a comparator 7 which is responsive to changes in the input signals, as will be described later in detail, to control the position of a meter 8 and the output signal of an audio circuit 9.

Oscillator 1 and oscillator 2 also connect, respectively, to ground neutralization circuits 10 and 11. Ground neutralization circuits 10 and 11 act to prevent any change in signal amplitude due to the presence of ferromagnetic minerals in the vicinity of search coil 4.

In operation, the circuit indicated by FIG. 1, would apply the low frequency signal from oscillator 1 and the high frequency signal from oscillator 2 through mixer 3 to the winding of inductive search coil 4. These signals would be applied sequentially, by pulsing, or simultaneously, by combining the two signals into a composite signal in mixer 3. If a metallic object is in the vicinity of search coil 4, the signal induced in search coil 4 will change. The change in the signal is reflected back to the sources, oscillators 1 and 2, and is detected by the respective amplifier/detector circuits 5 and 6. If the metallic object in the field of search coil 4 has a high Q, such as a gold or silver coin, the response of search coil 4 to the applied low frequency signal from oscillator 1 will be significantly greater than its response to the applied high frequency signal from oscillator 2. However, if a metallic object having either a low Q or a ferrous content, such as a pull tab or a bottle cap, is placed in the vicinity of search coil 4, the response to the applied high frequency signal will be distinguishably greater than the response to the applied low frequency signal.

By comparing the responses of the high and low frequency signals, an indication of the type of object in the field of search coil 4 can be derived. Thus, not only can the presence of a metallic object in the vicinity of search coil 4 be detected, the general nature of the detected object can be determined.

Figure 2:
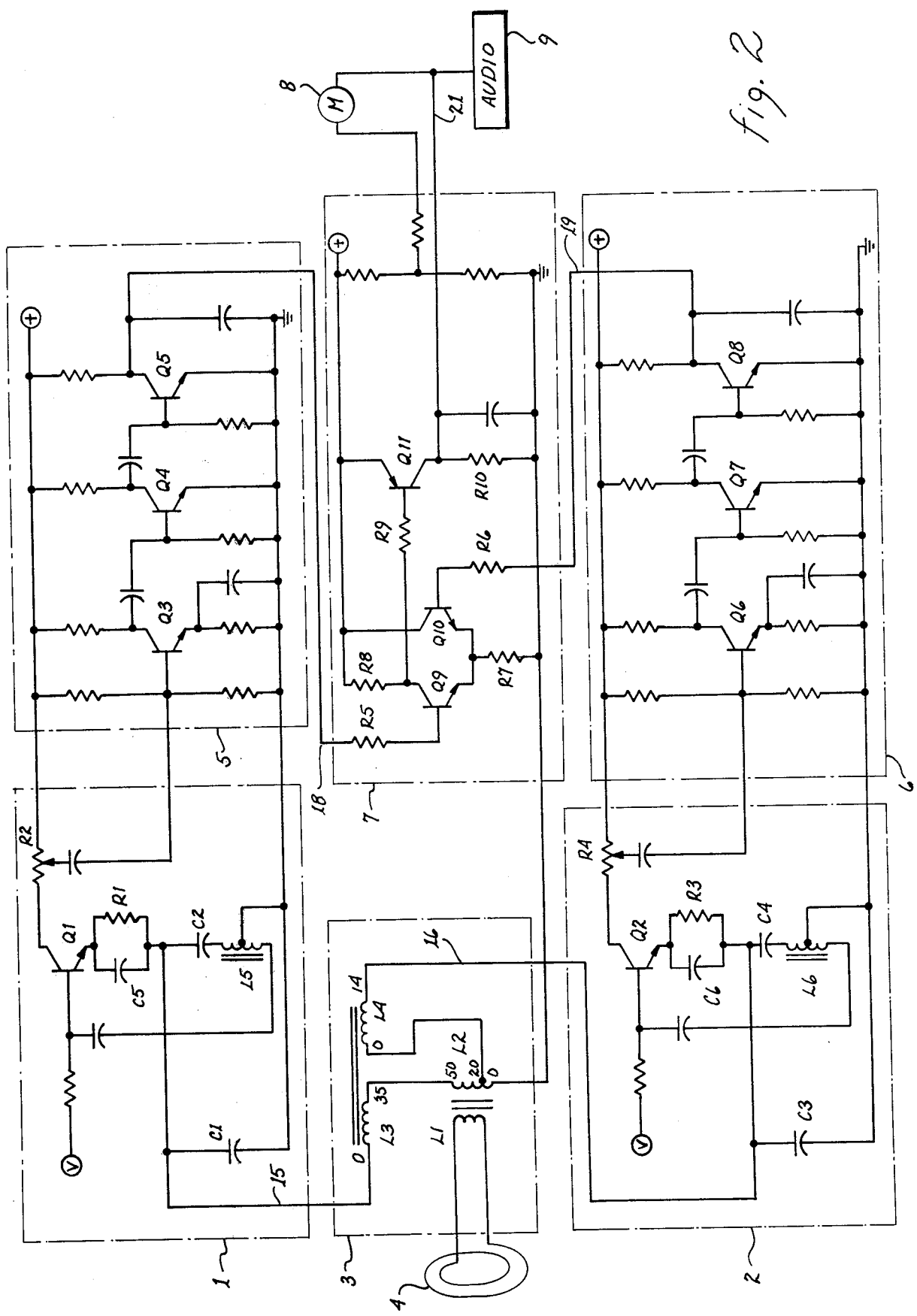
FIG. 2 is a schematic of the circuit for the metal detector of FIG. 1.

Referring now to FIG. 2, the circuitry of the metal detector shown in FIG. 1 will be described in detail. Oscillator 1 includes a transistor Q1 and a parallel resonant circuit made up from capacitor C1 and a part of mixer 3, inductors L3 and L2, which will be explained later in more detail. Transistor Q1 is self-biasing due to the parallel circuit of capacitor C5 and resistor R1. The feedback necessary to sustain oscillation is provided by a series resonant circuit comprising inductor L5 and capacitor C2. This series resonant circuit is tuned to a frequency above that of the parallel resonant circuit. Oscillator 1 will operate at a frequency between the two resonant frequencies as a result of the limiting characteristics of the resonant circuits. As the frequency of oscillator 1 increases to approach the frequency of the series resonant circuit, greater feedback will be provided. However, the parallel resonant circuit will be coincidentally operating further from its resonant frequency, thereby reducing both the impedance and circuit Q. When the frequency of oscillator 1 decreases to approach the frequency of the parallel resonant circuit, the impedance and circuit Q will both increase. Resultingly, however, feedback will be reduced since the series resonant circuit will be operating further from its resonant frequency. The frequency of oscillator 1 will therefore stabilize between the two resonant frequencies.

As the inductance of search coil 4 is increased by the proximity of ferromagnetic material, that increased inductance is reflected into the parallel resonant circuit, thereby increasing the inductance while improving the circuit Q of the parallel resonant circuit. However, the increased inductance also acts to decrease the resonant frequency of the parallel resonant circuit. This causes the resonant frequency of the parallel circuit to move even further from the normal operating frequency of oscillator 1 (which is between the resonant frequency of the parallel circuit and the resonant frequency of the series circuit), producing a resultant decrease in the impedance of the parallel circuit. If the proper values of the circuit components have been selected, the output amplitude of oscillator 1 will remain constant, despite the presence of ferromagnetic material in the vicinity of search coil 4, since the increased circuit Q will be neutralized by the reduction in circuit impedance. Oscillator 2 will similarly be unaffected by the presence of ferromagnetic minerals in the vicinity of search coil 4 since it also utilizes a series parallel resonant circuit configuration, as will be explained later.

Oscillator 2 includes a transistor Q2 and a parallel resonant circuit made up from capacitor C3 and part of mixer 3, inductors L4 and the 0-20 turn portion of inductive winding L2. Transistor Q2 is self-biased by the circuit of capacitor C6 and resistor R3. The feedback to sustain oscillation is provided by the series resonant circuit comprising inductor L6 and capacitor C4. As with the series resonant circuit associated with oscillator 1, the series resonant circuit provided by inductor L6 and capacitor C4 is tuned to a frequency above that of the parallel resonant circuit to neutralize effects of ferromagnetic material in the vicinity of search coil 4. It should be noted that the series and parallel resonant circuits contained within oscillators 1 and 2 of FIG. 2 correspond to the ground neutralization circuits 10 and 11 of FIG. 1.

The output sine wave of oscillator 1 is applied via lead 15 to inductor L3 in mixer 3. The output sine wave of oscillator 2 is applied via lead 16 to inductor L4 in mixer 3. Inductors L3 and L4 connect in a T-configuration to inductor L2 of mixer 3 to produce a complex waveform, which is applied to search coil 4 via the inductive coupling of secondary winding L1, and to isolate oscillators 1 and 2 from each other. The inductances of inductor L2 and L3 are equal so that equal voltages appear across each inductor as a result of the output signal on lead 15. Inductor L4 is wound on the same core as inductor L3, and the number of turns in inductor L4 is selected so that the voltage across it will equal the voltage across the 0-20 turn portion of inductor L2. As a result, any voltage appearing in the 0-20 turn portion of inductor L2 in response to the signal applied at lead 15 will be equalled by a voltage in series opposition across inductor L4 so that the voltage between ground and lead 16 will remain zero.

Similarly, the inductances of inductor L4 and the 0-20 turn portion of inductor L2 are equal to each other so that equal voltages appear across each in response to a signal applied to lead 16. Inductor L3 is wound on the same core as inductor L4 and has its number of turns selected so that the voltage across inductor L3 will equal the voltage across the entire inductor L2. The voltage appearing across inductance L2 in response to the signal applied to lead 16 will be equalled by a voltage in series opposition appearing across inductor L3, so that the voltage between lead 15 and ground will also remain zero.

Search coil 4 is an air core inductor made by winding a number of turns of wire in a flat helix. Since search coil 4 is driven by inductor L2 through secondary winding L1, any metal object within the magnetic field generated by search coil 4 will appear to be a load being driven by the search coil. The increased load will reduce the circuit Q and reduce the amplitude of oscillation for both the low and high frequency oscillators 1 and 2, respectively. Since oscillators 1 and 2 drive search coil 4 independently of each other, each oscillator produces an individual response to the loading effects of metal objects in the vicinity of the search coil.

Small ferrous objects, such as bottle caps, and thin metal objects having a low Q such as aluminum can pull tabs, have a significantly greater loading effect upon high frequency oscillator 2 than they have on low frequency oscillator 1. As a result, the amplitude reduction of the high frequency signal will be greater than the amplitude reduction of the low frequency signal. The response of the oscillators to the presence of a high Q object, such as a coin, within the field of search coil 4 produces the opposite result. That is, the amplitude reduction of the low frequency signal is greater than the amplitude reduction of the high frequency signal. Thus, the nature of the object in the field of search coil 4 can be determined from the difference in response of the low and high frequency oscillators, oscillator 1 and oscillator 2, respectively.

Transistor Q1 in oscillator 1 connects to a potentiometer R2 as a collector load. The moveable contact of potentiometer R2 is capacitively coupled to amplifier/detector circuit 5 to provide a lower amplitude sine wave input. Similarly, transistor Q2 is oscillator 2 connects to a potentiometer R4 as a collector load. The moveable contact of potentiometer R4 is also capacitively coupled to its amplifier/detector circuit 6 to provide a lower amplitude sine wave input. The circuitry of amplifier/ detector circuits 5 and 6 is well knwon and will not be detailed here. The positioning of the moveable contacts of potentiometers R2 and R4 can be selected to obtain the sensitivity desired; that is, they can be adjusted to regulate the amount of amplitude change resulting from the proximity of a metallic object to search coil 4.

Output leads 18 and 19 from amplifier/detector circuits 5 and 6, respectively connect to comparator 7. Leads 18 and 19 carry a DC signal corresponding to the amplitude of the signals at oscillators 1 and 2, respectively. Comparator 7 includes a differential amplifier comprising transistors Q9 and Q10 and resistor R5, which connects to lead 18, resistor R6 which connects to lead 19 and resistors R7 and R8. If a valuable object, such as a coin, is placed in proximity to search coil 4, the DC signal on boths leads 18 and 19 will change in a positive going direction. However, the signal on lead 18, which connects through resistor R5 to the base of transistor Q9, will increase more than the signal on lead 19. As a result, the current through the collector of transistor Q9 and resistor R8 will increase. The output signal from comparator 7 is provided through an amplifier within the comparator which includes resistors R9 and R10 and transistor Q11. The increased current in transistor Q9 is amplified by transistor Q11 and appears as a positive going voltage change across resistor R10 and on output lead 21.

If a potentially worthless object is in proximity with search coil 4, the signals on leads 18 and 19 cause a positive going change, as resulted from a potentially valuable object. However, in this instance the input to transistor Q10 through resistor R6 increases more than the input to transistor Q9 through resistor R5. As a result, the current flowing through transistor Q9 and resistor R8 will decrease. This decrease in current will be amplified by transistor Q11 and will appear as a negative going voltage change across resistor R10 and on output lead 21 which is indicative of a worthless object.

Output lead 21 connects to an audio circuit 9 and a meter 8. The distinctive signals appearing on lead 21 can be used to produce identifiable output signals at either or both meter 8 and circuit 9.

The above explanation of operation is predicated upon the objects being simply ferromagnetic, or non-ferromagnetic; However, when the circuit is used in actual practice, the objects frequently will be partly ferromagnetic and partly non-ferromagnetic or paramagnetic and the action of the circuit becomes more complicated. The following component values, when placed in the circuit of FIG. 2, have been found to operate satisfactorily and permit the detection of, and differentiation between ferromagnetic objects (such as aluminum pull tabs), and valuable non-ferromagnetic objects (such as gold coins):

Search coil 4: 5 turns of No. 14 magnet wire, wound in a flat helix of 10 inches outside diameter with a 4 inches center hole, pressed into a ½ inch thick styrofoam disc and encased in a shell of plastic 0.028 inch thick.

Inductor L1: 2 turns of No. 14 stranded insulated wire wound on a bobbin and mounted within a 30 × 19 mm. cup core.

Inductor L2: 50 turns of No. 29 magnet wire, tapped at 20 turns, wound on the same bobbin as inductor L1 and mounted within the same cup core.

Inductor L3: 35 turns of No. 29 magnet wire, wound on a bobbin and mounted within a 30 × 19 mm. cup core.

Inductor L4: 14 turns of No. 29 magnet wire, wound on the same bobbin as inductor L3 and mounted with the same cup core.

Inductor L5: 360 turns of No. 29 magnet wire, tapped at 110 turns, wound on a bobbin and mounted within a 30 × 19 mm. cup core.

Inductor L6: 120 turns of No. 24 magnet wire, tapped at 40 turns, wound on a bobbin and mounted within a 30 × 19 mm. cup core.

Capacitor C1: 1.282 microfarads

Capacitor C2: 0.057 microfarads

Capacitor C3: 0.325 microfarads

Capacitor C4: 0.050 microfarads

Operating Frequencies: Oscillator 1 at 2.134 KHz Oscillator 2 at 11.054 KHz

Component values for the series and parallel resonant circuits of oscillators 1 and 2 are empirically determined since their values do not necessarily correspond to calculated values.

It should be obvious to those skilled in the art that various modifications could be made to the described metal detector without departing from the spirit and scope of the present invention. The component values indicated may also be modified to suit a particular application. Although the circuit described applies both the low and high frequency signals simultaneously to search coil 4, it should be apparent that the signals could be pulsed and applied sequentially. Further, the oscillators 1 and 2 could also be replaced by a single multi-frequency oscillator with a pulsed output. It is also possible to simplify the detector by removing the ground neutralization circuits and using conventional oscillators. Of course, if this is done, the ground neutralizing capability of the detector is lost. However, such a modified detector would still retain the capacity to selectively respond to different classes of metal objects.

What is claimed is:

1. Apparatus for detecting metallic objects near the surface of the earth, said apparatus comprising in combination:

a. a low frequency oscillator for generating a low frequency signal, said low frequency oscillator having a series resonant circuit tuned to a first frequency and a parallel resonant circuit tuned to a second frequency different from said first frequency, wherein one of said series and parallel resonant circuits is connected to provide a feedback signal in said low frequency oscillator;

b. a high frequency oscillator for generating a high frequency signal, said high frequency oscillator having a series resonant circuit tuned to a third frequency and a parallel resonant circuit tuned to a fourth frequency different from said third frequency, wherein one of said series and parallel resonant circuits is connected to provide a feedback signal in said high frequency oscillator;

c. a mixer means connected to said low frequency oscillator and to said high frequency oscillator for receiving said low frequency signal and said high frequency signal while isolating said low frequency oscillator and said high frequency oscillator from each other;

d. a search coil inductively coupled to said mixer means and driven by said low frequency signal and said high frequency signal to concurrently establish an electromagnetic field and generate an output signal, said output signal being both responsive to the established field and to any change thereof produced by the proximity of a metallic object to said search coil; and e. an output means connected to both said low frequency oscillator and said high frequency oscillator and controlled by said output signal from said search coil for giving a first indication of the amplitude of said output signal when said search coil is driven by said low frequency signal and for giving a second indication of the amplitude of said output signal when said search coil is driven by said high frequency signal, and for producing a comparison signal signifying the relative amplitude between said first indication and said second indication.

2. Apparatus in accordance with claim 1 wherein
a. said series resonant circuit in said low frequency oscillator is connected to provide said feedback signal in said low frequency oscillator; and
b. said series resonant circuit in said high frequency oscillator is connected to provide said feedback signal in said high frequency oscillator.

3. Appartus in accordance with claim 1 wherein
a. said first frequency is higher than said second frequency; and
b. said third frequency is higher than said fourth frequency.

4. Apparatus in accordance with claim 1 further including
a. a first ground neutralization means connected to said low frequency oscillator for preventing the presence of ferromagnetic material in the vicinity of said search coil from altering the amplitude of said output signal when said search coil is driven by said low frequency signal; and
b. a second ground neutralization means connected to said high frequency oscillator for preventing the presence of ferromagnetic material in the vicinity of said search coil from altering the amplitude of said output signal when said search coil is driven by said high frequency signal.

5. Apparatus in accordance with claim 1, wherein said output means includes
a differential amplifier connected to both said low frequency oscillator and said high frequency oscillator and responsive to both said first indication and said second indication for producing said comparison signal.

6. Apparatus in accordance with claim 1 wherein said mixer means includes
a. a first core;
b. a second core;
c. a primary winding wound around said first core and having an intermediate tap and an end tap;
d. a first inductor wound around said second core and connected between said low frequency oscillator and said end tap;
e. a second inductor wound around said second core and connected between said high frequency oscillator and said intermediate tap; and
f. a secondary winding wound around said first core and connected to said search coil.

7. Apparatus in accordance with claim 6 wherein
a. said series resonant circuit in said low frequency oscillator is connected to provide said feedback signal in said low frequency oscillator; and
b. said series resonant circuit in said high frequency oscillator is connected to provide said feedback signal in said high frequency oscillator.

8. Apparatus in accordance with claim 7 wherein
a. said first frequency is higher than said second frequency; and
b. said third frequency is higher than said fourth frequency.

9. Apparatus in accordance with claim 8 further including
a. a first ground neutralization means connected to said low frequency oscillator for preventing the presence of ferromagnetic material in the vicinity of said search coil from altering the amplitude of said output signal when said search coil is driven by said low frequency signal; and
b. a second ground neutralization means connected to said high frequency oscillator for preventing the presence of ferromagnetic material in the vicinity of said search coil from altering the amplitude of said output signal when said search coil is driven by said high frequency signal.

10. Apparatus in accordance with claim 9, wherein said output means includes
a differential amplifier connected to both said low frequency oscillator and said high frequency oscillator and responsive to both said first indication and said second indication for producing said comparison signal.

11. Apparatus set forth in claim 1 wherein said low frequency oscillator and said high frequency oscillator comprise a single oscillator generating a low frequency signal and a high frequency signal in alternating sequence.

* * * * *